United States Patent [19]

Melocik

[11] 4,144,946

[45] Mar. 20, 1979

[54] HYDRAULIC PRIORITY CIRCUIT

[75] Inventor: Grant C. Melocik, Chardon, Ohio

[73] Assignee: Towmotor Corporation, Mentor, Ohio

[21] Appl. No.: 813,031

[22] Filed: Jul. 5, 1977

[51] Int. Cl.[2] .................... B62D 5/00

[52] U.S. Cl. .................... 180/132; 60/422; 60/DIG. 2

[58] Field of Search .................... 180/132, 141, 142, 143; 60/422, 420, 413, DIG. 2; 91/412; 137/101

[56] References Cited

U.S. PATENT DOCUMENTS

| | | | |
|---|---|---|---|
| 3,463,187 | 8/1969 | Rue | 137/596 |
| 3,568,868 | 3/1971 | Chichester | 137/101 X |
| 3,697,384 | 10/1972 | Walker | 203/1 |
| 3,875,747 | 4/1975 | Briggs | 60/420 |
| 4,002,220 | 1/1977 | Wible | 60/422 |

FOREIGN PATENT DOCUMENTS

| | | | |
|---|---|---|---|
| 1385099 | 2/1975 | United Kingdom | 60/413 |

*Primary Examiner*—John A. Pekar

*Attorney, Agent, or Firm*—Phillips, Moore, Weissenberger, Lempio & Strabala

[57] ABSTRACT

A hydraulic priority circuit for a fork lift truck having a primary work system for providing power steering and a secondary work system for raising a fork along a mast and for tilting the mast. A variable speed electric motor drives a variable output pump to supply pressurized fluid which is divided by a flow divider into two streams leading to the primary and secondary work systems, respectively. A priority solenoid valve is controlled by a device which detects preselected conditions of the truck to direct all the fluid in the stream leading to the primary work system either to the primary work system when the truck is in drive or is rolling, or to the secondary work system when the truck is in neutral and stationary.

15 Claims, 1 Drawing Figure

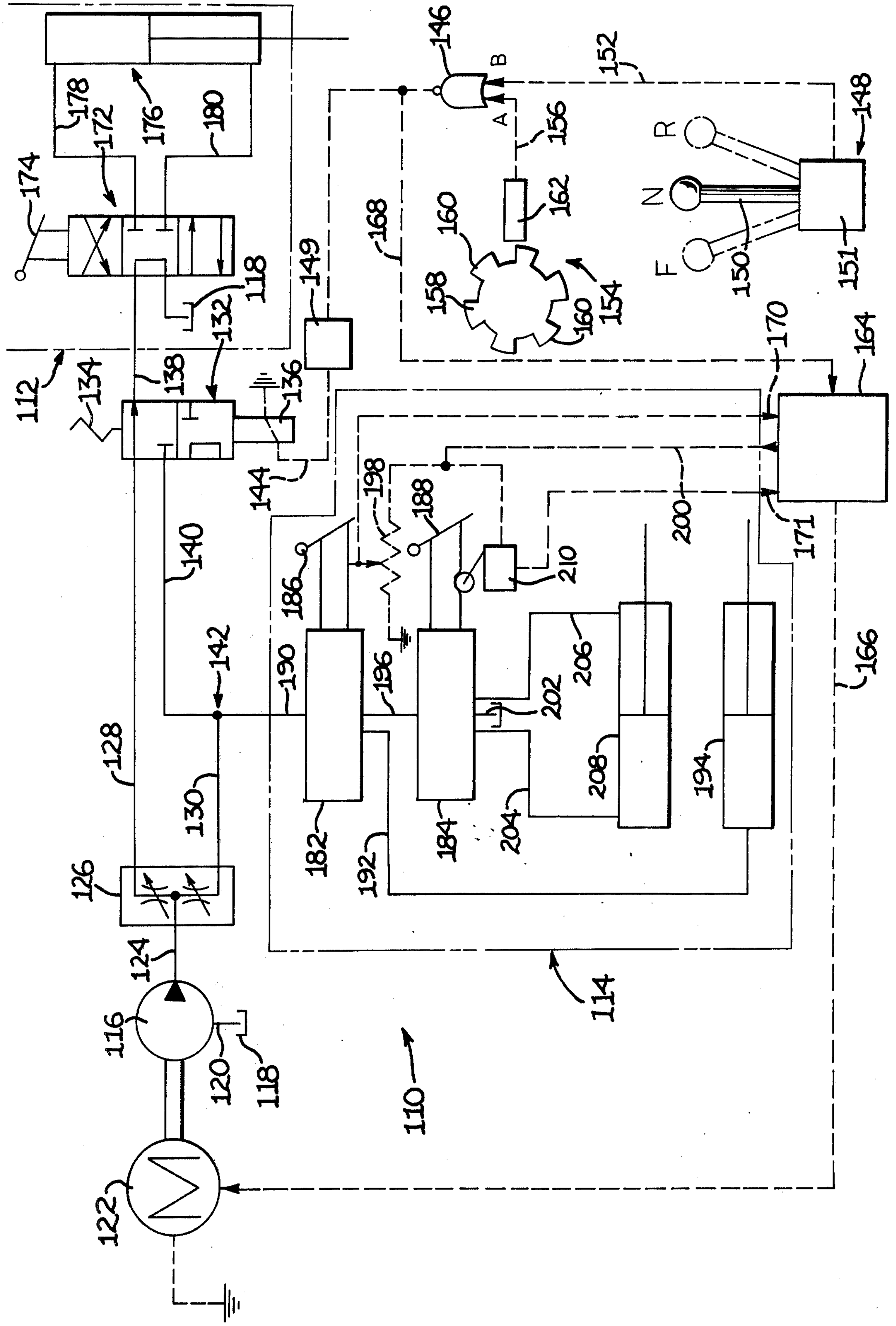
110
112
114
116
118
120
122
124
126
128
130
132
134
136
138
140
142
144
146
148
149
150
151
152
154
156
158
160
162
164
166
168
170
171
172
174
176
178
180
182
184
186
188
190
192
194
196
198
200
202
204
206
208
210
A
B
R
N
F

HYDRAULIC PRIORITY CIRCUIT

BACKGROUND OF THE INVENTION

The present invention relates to a fluid circuit and, more specifically, to a priority circuit which provides hydraulic fluid to a primary work system and a secondary work system on demand.

Hydraulic circuits are used in vehicles such as fork lift trucks to supply fluid to a primary work system and a secondary work system. Typically, the primary system is a hydraulically operated steering mechanism and the secondary system is a hydraulically operated mechanism for lifting load-carrying forks on a mast and for tilting the mast. The hydraulic circuit generally includes a variable speed electric motor which drives a variable output pump that supplies fluid for the primary and secondary systems.

The different work systems of the fork lift vehicle may require different delivery rates from the pump for satisfactory operation. For example, the steering mechanism may require a full delivery rate of two gallons per minute, the tilting mechanism six gallons per minute, and the lifting mechanism sixteen gallons per minute to raise the forks. These different delivery rates are provided by varying the speed of the motor and hence pump output to perform these functions.

More recent hydraulic circuits include some form of flow divider which divides the pump output to provide priority fluid flow to the primary work system and additional fluid flow to the secondary work system. As long as the pump is running, the divider supplies the first two gallons per minute of fluid flow to the steering mechanism, thereby always having available a continuous full supply of fluid flow for powering the steering mechanism. The pump is caused to increase its output when the tilting or lifting mechanisms are operated, whereby the flow divider supplies a fluid flow in excess of the supply to the steering mechanism for operation of the former mechanisms.

The above prior hydraulic priority circuits have the disadvantage of wasting electrical power for operating the electric motor to drive the pump at increased capacity. Sufficient electrical power must be provided to supply the excess fluid flow even when the power steering mechanism is not being utilized and the fluid flow to it returned to a reservoir. For example, to operate the tilting mechanism, the electric motor must be operated to provide a pump output of eight gallons per minute, while only six gallons per minute are required for tilting the mast. Thus, under these conditions there is a waste of fluid flow of two gallons per minute and the corresponding electrical power used to provide it.

Still other hydraulic priority circuits also always provide the power steering mechanism with fluid flow, but at a lesser flow rate than the required full flow rate when the steering mechanism is not being used. The full flow rate is provided only on demand by the steering mechanism. However, a problem with these other priority circuits is the relatively long time delay between the time a demand is made and the time the fluid flow can be increased from the lesser to the full flow.

SUMMARY OF THE INVENTION

The present invention is directed to overcoming one or more of the problems set forth above.

According to the present invention, there is provided a fluid circuit including a primary work means having a first motor means responsive to fluid flow, a secondary work means having a second motor means responsive to fluid flow, pump means for delivering a flow of fluid, means for dividing the fluid flow into first and second streams, means operable independently of said primary and second work means, means for automatically, selectively directing all of the first stream to one of the primary work means and the secondary work means in response to at least one preselected condition of the independently operable means, and means for delivering the second stream from the dividing means to the secondary work means.

BRIEF DESCRIPTION OF THE DRAWINGS

These and other objects and advantages of the present invention will become apparent from the following description and the accompanying drawing in which the single FIGURE is a schematic representation of the invention.

DETAILED DESCRIPTION OF THE DRAWINGS

With reference to the drawing, there is shown a fluid circuit 110 for a vehicle such as a fork lift truck. The vehicle may have power steering control provided by a primary work system 112, together with a load-carrying fork and mast assembly hydraulically operated by a secondary work system 114. A variable speed pump 116 has its inlet connected to a hydraulic fluid reservoir 118 via a conduit 120 to pump fluid, preferably oil. Pump 116 is operatively coupled to a variable speed electric motor 122 which varies the speed and, hence, the output of pump 116. A conduit 124 feeds the fluid output of pump 116 to a flow divider 126, of a type well known in the art, which divides the fluid flow in conduit 124 into first and second streams which flow through conduits 128 and 130 respectively. Flow divider 126 is designed to supply the first N gallons/minute of fluid flow in conduit 124 to conduit 128 for hydraulically operating the primary work system 112 and the excess fluid flow above N gallons/minute to conduit 130 for hydraulically controlling the secondary work system 114.

A two-position valve 132, preferably a solenoid valve, controls the supply of the fluid flow in conduit 128 to either the primary work system 112 or the secondary work system 114. Valve 132 is biased by means 134, such as a spring, into one position shown in the drawing and changes its position upon energization of a solenoid 136. In the position shown in the drawing, the valve 132 directs all the fluid in conduit 128 to a first outlet conduit 138 to supply the primary work system 112. When the solenoid 136 is energized, the valve 132 changes state to its other position to block any fluid flow from conduit 128 to conduit 138 and direct such fluid flow from conduit 128 to a second outlet conduit 140 which connects with conduit 130 at an adding junction 142 to supply the secondary work system 114.

Solenoid 136 of valve 132 is energized in response to a control signal on a conductor 144 coupled to the output of a NOR gate 146 through a driver circuit 149, which comprises an amplifier. A vehicle directional control circuit 148 having an operator actuated vehicle drive-direction selector or control lever 150 and sensor 151 is connected via conductor 152 to one input of NOR gate 146. Sensor 151 senses the position of selector 150 and produces a signal on line 152 relating to this position, i.e., neutral position on the one hand, or forward or reverse on the other hand.

A vehicle ground speed sensing device 154 is connected via conductor 156 to the other input of gate 146. Sensing device 154 includes, preferably, a wheel 158, which may be coupled to the vehicle ground wheels (not shown) and rotatable whenever the ground wheels are moving to indicate locomotion of the vehicle. Wheel 158 may include a plurality of magnetic elements 160 at its periphery which are detected by a magnetic detector 162 to produce a signal on conductor 156 whenever the vehicle is in motion.

When the drive-direction selector 150 is in a position other than the neutral position, or when the vehicle is rolling, then power steering of the vehicle is required. Accordingly, when either of these conditions occur, control circuit 148 or sensing device 154 will provide, for example, a high signal on conductors 152 or 156 respectively, thereby enabling NOR gate 146 to provide a low signal on line 144 for de-energizing solenoid 136. This will maintain valve 132 in its upper or first position shown in the drawing to direct all of the fluid in conduit 128 to conduit 138. If, however, selector 150 is in the neutral position and the vehicle is stationary, then power steering of the vehicle is not required. Consequently, under these two conditions circuit 148 and sensing device 154 will provide a low signal, thereby enabling gate 146 to provide a high signal on line 144 for energizing solenoid 136. Accordingly, valve 132 will be switched to its lower or second position to direct or feed back all of the fluid in conduit 128 to conduit 140, whereby it will be added to the fluid in conduit 130 at junction 142. As may be appreciated, the sensing device 154 constitutes a feature which allows for power steering when the vehicle is in neutral but still may be rolling.

The speed of motor 122 and hence the output of pump 116 in conduit 124 is controlled by a conventional thyristor speed control circuit 164 which provides a speed control signal via conductor 166 coupled to motor 122. Circuit 164 is responsive to input control signals either from the output of NOR gate 146 via line 168 or on conductors 170, 171 from secondary work system 114.

As already indicated, the power steering mechanism may require a hydraulic flow rate of only two gallons/minute, whereas a delivery rate of six gallons/minute may be required to tilt a fork lift truck mast and sixteen gallons/minute required to lift a loaded fork along the mast. Consequently, the control circuit 164 provides an output on conductor 166 to adjust the speed of the motor 122 so that proper delivery rates are provided on demand by the vehicle operator, as will be more fully described.

The primary work system 112 for the steering mechanism of the fork lift truck includes a conventional steering directional control valve 172 which is operated in a conventional manner by a control arm 174, and a motor means 176 constituting a steering cylinder or actuator. In the position shown, valve 172 dumps any fluid received in conduit 138 to the reservoir 118. In the other positions of the valve 172, fluid in conduit 138 is directed either to output conduits 178 or 180 to control the actuator 176 in a standard manner.

Secondary work system 114 is also conventional, but will be described briefly for a better understanding of the invention. System 114 includes two standard implement valves 182 and 184 each controlled by a control arm 186 and 188, respectively, movable by the vehicle operator. In one position, valve 182 receives hydraulic fluid from an input conduit 190 coupled to junction 142 and supplies fluid over an output conduit 192 to a motor means or actuator 194 for raising the fork along the mast of the fork lift truck. In another position, valve 182 couples fluid from input conduit 190 to an output conduit 196 which is the input for valve 184.

A speed control potentiometer 198 is coupled to lift control arm 186 and circuit 164 via line 200 and provides a control signal in a standard manner on conductor 170 in response to the position of valve 182. If valve 182 is in the position coupling conduit 190 to conduit 192, then the signal on conductor 170 from potentiometer 198 will cause circuit 164 to change the speed of motor 122 to meet the demand for raising the fork.

Valve 184 has one position coupling conduit 196 to an output conduit 202 for dumping hydraulic fluid to the reservoir 118. In two other respective positions, valve 184 couples conduit 196 to output conduits 204 and 206 for operating a motor means or actuator 208 which tilts the mast in either of two directions. Microswitch 210 is coupled to control arm 188 to provide a signal on conductor 171 in response to the position of valve 184. When this valve 184 couples hydraulic fluid to conduits 204 or 206, then microswitch 210 couples a control signal from line 200 to line 171 which causes circuit 164 to change the speed of motor 122 for producing the necessary demand to tilt the mast.

In operation, assume, for example, that lever 150 is in forward or reverse position, corresponding to forward or reverse drive of the vehicle, so that a supply of fluid flow should be available to the primary work system 112. Also, assume with the fork lift truck in drive and moving, that neither of the actuators 194 or 208 should receive hydraulic fluid to raise the fork or tilt the mast; consequently, potentiometer 198 and microswitch 210 will be in a position corresponding to no demand for hydraulic fluid. Under these conditions, control circuit 164 will receive a signal on conductor 168 so as to adjust the speed of motor 122 for producing a delivery rate of two gallons/minute from pump 116 in conduit 124. Flow divider 126 will direct this first two gallons/minute over conduit 128 to valve 132. Since solenoid 136 will be de-energized, the two gallons/minute will flow from conduit 128 to conduit 138 and thereby be available for power steering control.

Assume now that the fork lift truck has stopped at its destination and the operator wants to tilt the fork lift mast. Accordingly, lever 150 is moved to the neutral position so that solenoid 136 is energized. Also, control arm 188 is moved so that a signal is provided to circuit 164 which then increases the speed of motor 122 so that pump 116 outputs a delivery rate in conduit 124 of six gallons/minute. The first two gallons/minute are supplied by flow divider 126 over conduit 128 to valve 132; however, this time, with solenoid 136 energized, the flow in conduit 128 is directed to conduit 140. At the same time, the excess four gallons/minute are directed by flow divider 126 to conduit 130 where they are added at junction 142 with the two gallons/minute in conduit 140 to provide the necessary six gallons/minute for actuator 208. Similarly, if the operator wants to lift the forks, he moves control arm 186 so that circuit 164 responds to the resultant signal on line 170 from potentiometer 198 for increasing the speed of motor 122. As a result, pump 116 provides an output of sixteen gallons/minute into flow divider 126 which divides this flow into two gallons/minute in conduit 128 and fourteen gallons/minute in conduit 130. These two flows are added at junction 142 and then provided to conduit 192 for moving actuator 194.

It will be appreciated from the above, that by directing the power fluid supply for primary work system 112 to the secondary work system 114 when the former need not be operated, that there is a saving in electrical power needed to drive motor 122. Without the feedback of the fluid flow in conduit 128 to conduit 140 provided by valve 132, pump 124 would have to produce, for example, a flow of eight gallons/minute to operate actuator 208, with two gallons/minute always being directed to primary work system 112 even when not needed and the excess six gallons/minute being provided to work system 114.

Moreover, with the present invention, a fluid supply for primary work system 112 is always quickly available when needed merely by changing the position of valve 132 to direct flow to conduit 138 rather than to conduit 140. It also will be noted that the control circuit 148 and sensing device 154 constitute a system that is operable independently of the primary work system 112 and secondary work system 114. Thus, for example, the vehicle operator can be assured of a full fluid supply for power steering before valve 172 is actuated, by first controlling lever 150.

Furthermore, no electrical power is wasted by supplying fluid to secondary work system 114 when this system need not be utilized; however, when demanded, a fluid supply is available merely by moving control arms 186 and 188. Thus, when only power steering control is required, motor 122 is supplied with power only to produce the delivery rate in conduits 128 and 138 without any fluid supply to system 114.

While the invention has been particularly shown and described with reference to a preferred embodiment thereof, it will be understood by those skilled in the art that the foregoing and other changes in form and details may be made therein without departing from the spirit and scope of the invention.

The embodiments of the invention in which an exclusive property or privilege is claimed are defined as follows:

1. A fluid circuit, comprising:
   - a primary work system, said primary system having first motor means for performing work in response to fluid flow;
   - a secondary work system, said secondary work system having second motor means for performing work in response to fluid flow;
   - pump means for providing a flow of fluid for said first motor means and said second motor means;
   - means for dividing the fluid flow from said pump means into first and second streams;
   - means for controlling the direction of flow of the first stream, said controlling means being constructed to be operable independently of said primary work system and said secondary work system and to have one position and at least one other position;
   - means for directing all of the first stream to said primary work system or said secondary work system in response to the position of said controlling means; and
   - means for delivering the second stream from said dividing means to said secondary work system.

2. A fluid circuit, as set forth in claim 1, wherein said means for controlling includes:
   - a vehicle drive-direction selector, said selector being constructed to be movable to a plurality of positions; and
   - means for sensing the position of said drive-direction selector and for providing control signals in response to the positions of said selector, said directing means being responsive to the control signals.

3. A fluid circuit, as set forth in claim 2, wherein said directing means includes a valve connected to said sensing and providing means and being constructed to be movable to a first position in response to one of the control signals and a second position in response to another of the control signals, said valve communicating the first fluid stream with said primary work system in the first position and communicating the first fluid stream with said secondary work system in the second position, said valve being at the second position in response to said drive-direction selector being at a neutral position and being at the first position in response to said drive-direction selector being at a position other than neutral.

4. A fluid circuit, as set forth in claim 1, wherein said means for controlling includes:
   - means for indicating locomotion of a vehicle, said indicating means having one position corresponding to movement of the vehicle and another position corresponding to non-movement of the vehicle; and
   - first means for sensing the position of said indicating means and for generating first control signals in response to the positions of said indicating means, said directing means being responsive to the first control signals.

5. A fluid circuit, as set forth in claim 4, wherein said directing means includes a valve connected to said first sensing means and being constructed to be movable to a first position in response to one of the first control signals and a second position in response to another of the control signals, said valve communicating the first fluid stream with said primary work system in the first position and communicating the first fluid stream with said secondary work system in the second position, said valve being at the first position in response to said indicating means indicating movement of the vehicle and at the second position in response to said indicating means indicating non-movement of the vehicle.

6. A fluid circuit, as set forth in claim 4, wherein said means for controlling further includes:
   - a vehicle drive-direction selector, said selector being constructed to be movable to a plurality of positions; and
   - second means for sensing the position of said drive-direction selector and for generating second control signals in response to the positions of said selector, said directing means being responsive to at least one of the first control signals and the second control signals.

7. A fluid circuit, as set forth in claim 6, wherein said directing means includes a valve connected to said first and said second sensing means, said valve being constructed to be movable to a first position in response to one of the first and second control signals and a second position in response to another one of the first and second control signals, said valve communicating the first fluid stream with said primary work system in the first position and communicating the first fluid stream with said secondary work system in the second position, said valve being at the first position in response to said indicating means indicating movement of the vehicle or said drive-direction selector being at a position other than neutral and at the second position in response to said indicating means indicating non-movement of the vehicle and said drive-direction selector being at a position of neutral.

8. A fluid circuit, as set forth in claim 7, wherein said valve includes means for biasing said valve to the first position.

9. A fluid circuit, as set forth in claim 7, further including means for regulating said pump means to vary the flow of fluid from said pump means in response to the first and second control signals.

10. A fluid circuit, as set forth in claim 1, wherein said directing means includes means for combining the first stream with the second stream to provide a single stream of fluid flowing to said secondary work system.

11. A fluid circuit, as set forth in claim 1, wherein said dividing means includes means for providing the second stream as a portion of the fluid flow not required by said primary work system.

12. A fluid circuit, as set forth in claim 1, further including means for regulating said pump means; and wherein said controlling means includes means for sensing the position of said controlling means and generating a control signal in response thereto, said regulating means being responsive to said control signal to regulate said pump means.

13. A fluid circuit, as set forth in claim 1, wherein said means for dividing includes a priority valve, said priority valve being constructed to provide a first predetermined rate of the fluid flow as the first stream and a second rate of the fluid flow in excess of the first predetermined rate as the second stream.

14. A fluid circuit, as set forth in claim 1, wherein said directing means includes means for receiving the first fluid stream and adding the received first fluid stream to the second fluid stream.

15. A fluid circuit, as set forth in claim 1, wherein said controlling means includes means for generating a control signal providing information relating to movement of a vehicle, said directing means being responsive to said control signal to direct the first stream.

* * * * *